United States Patent [19]

Jamison

[11] 4,061,426
[45] Dec. 6, 1977

[54] OPTICAL ALIGNMENT DEVICE AND METHOD OF USE

[75] Inventor: Howard M. Jamison, Aberdeen, Md.

[73] Assignee: The United States of America as represented by the Secretary of the Army, Washington, D.C.

[21] Appl. No.: 664,334

[22] Filed: Mar. 5, 1976

[51] Int. Cl.² .............................................. G01B 11/26
[52] U.S. Cl. .................................. 356/138; 356/153; 356/247
[58] Field of Search ........................ 356/138, 153, 247

[56] References Cited

U.S. PATENT DOCUMENTS

| 2,353,272 | 7/1944 | Simmons et al. | 356/138 |
| 3,554,630 | 1/1971 | Rogers | 356/247 |

Primary Examiner—John K. Corbin
Assistant Examiner—R. A. Rosenberger
Attorney, Agent, or Firm—Nathan Edelberg; Robert P. Gibson; Saul Elbaum

[57] ABSTRACT

An optical alignment device, having a first optical path and a second optical path intersecting the first optical path, includes a positioning means to assure that the first optical path is perpendicular to a radiation sensitive surface at a point when positioned on the surface. The method includes positioning the optical alignment device on the radiation sensitive surface, viewing along the second optical path and adjusting the position of a source of radiation until the source appears centered on the first optical path.

7 Claims, 3 Drawing Figures

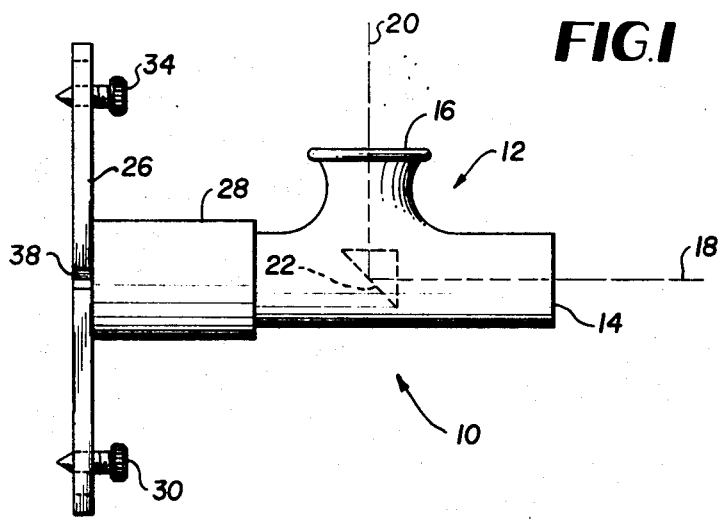
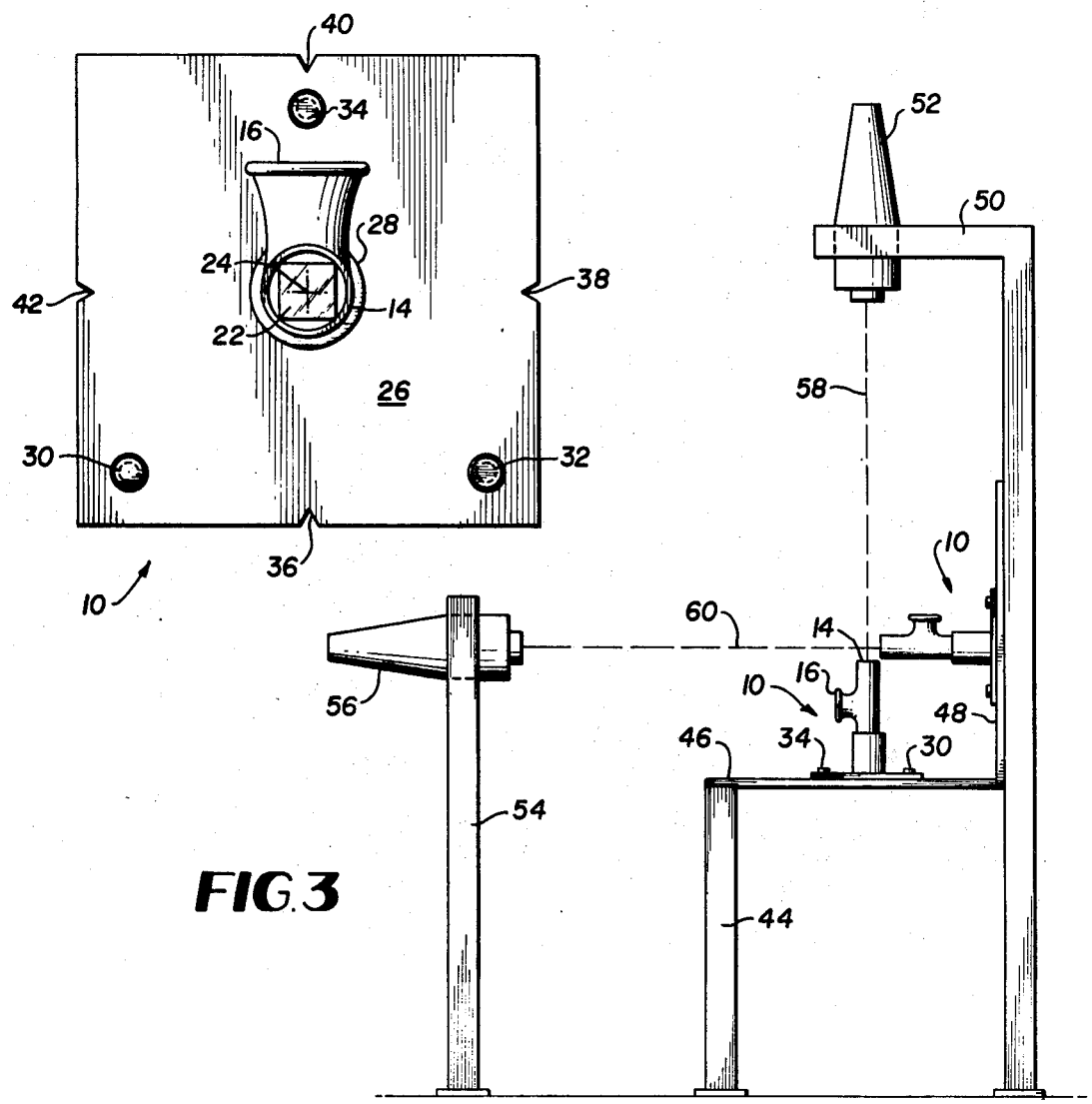

OPTICAL ALIGNMENT DEVICE AND METHOD OF USE

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention relates generally to optical alignment devices, and more particularly to an optical alignment device and method for use in photographic testing equipment.

2. Description of the Prior Art

In the field of projectile or missile flight analysis, a more accurate analysis has been obtained by using flash x-ray tubes and x-ray film. The resulting flash radiograph is used to measure the flight characteristics of the missile, including velocity. In order for accurate measurements to be made, it is critical that each individual flash x-ray tube be aligned perpendicular to an identifiable point on the surface of the x-ray film. For each measuring position, a pair of flash tubes are provided projecting onto separate film surfaces, ninety degrees apart. The previous method for aligning each flash x-ray tube involved setting up a transit or a theodolite and properly aligning it perpendicular to the surface of one of the films. Then as one individual looks through the transit, a second individual aligns the flash x-ray tube. Once a pair has been aligned, the transit is realigned to assure a perpendicular relationship to the plane of the film and the next pair of x-ray tubes are aligned. This process is repeated and may require as many as six movements in alignment in order to assure alignment of all of the tubes.

In addition to the number of movements, alignment, and personnel involved in properly aligning the flash x-ray tubes and the x-ray film, the flash radiography test equipment are generally located in an armored enclosure with a minimum amount of room for transit and personnel. This space limitation increases the time involved in setting up the transit and moving it for each alignment. Also, the transit has to be removed from the armored enclosure before each round is fired to prevent possible damage to as delicate an instrument as the transit. It should be noted that alignment with the transit involves a team of trained personnel familiar with the operation and use of the transit.

Thus there is a long-felt need for a simple portable optical alignment device for use in flash radiography by untrained personnel.

SUMMARY OF THE INVENTION

The present invention is an optical alignment device and method of use for aligning a source of radiation and radiation received along an optical axis. The device includes a housing having a first optical path and a second optical path intersecting the first optical path. Means are provided on the housing for positioning the housing on a receiver such that the first optical path is coincident with the optical axis and perpendicular to the surface of the receiver at a particular point. The source of radiation is adjusted in position until the source appears, by viewing along the second optical path, centered on the first optical path. Thus the source of radiation is aligned perpendicular to a selected point on the surface of the receiver. The positioning means includes a substantial planar surface or plate extending from a generally cylindrical housing and having at least three adjustable elements extending from the planar surface. The three elements are adjusted so as to define a plane perpendicular to the first optical path. This assures that the first optical path intersects the lane of the receiver perpendicularly. A reticle is also provided along the viewer's optical path to indicate the point at which the first optical path intersects the plane of the receiver and a series of notches are provided on the substantially planar surface of the positioning means so that said point is identifiable.

OBJECTS OF THE INVENTION

The object of the present invention is to provide an optical alignment device for use with flash radiograph equipment.

Another object is to provide an optical alignment device which may be used by untrained personnel.

A further object of the invention is to provide an optical alignment device which is positioned between a receiver and a source of radiation and thus application to photographic systems housed in close quarters.

A still further object of the present invention is to provide an optical alignment device which does not require any onsite adjustment to assure the perpendicular relationship of a first optical path relative to the plane of the radiation receiver.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevation of a preferred embodiment of the optical alignment device of the present invention.

FIG. 2 is a front view of a preferred embodiment of the optical alignment device of the present invention.

FIG. 3 is a side elevaton of the optical alignment device of the present invention in use with a typical flash radiograph system.

DESCRIPTION OF THE PREFERRED EMBODIMENTS

The preferred embodiment of the optical alignment device of the present invention 10, as illustrated in FIGS. 1 and 2, includes a generally cylindrical housing 12 and two optical ports 14 and 16, ninety degrees apart. Port 14 provides access to a first optical path 18 which traverses the longitudinal axis of the cylindrical housing 12 and optical port 14. A second optical path 20 intersects the first optical path 18 at an angle, preferably ninety degrees, and traverses port 16. The first and second optical paths 18 and 20 intersect at prism 22. Though optical element 22 is shown to be a prism, it should be noted that a mirror or other optical reflector can also be used so as to define basically a single optical path beginning at port 16 and traversing optical port 14. A reticle 24, as shown in FIG. 2, provides a visual indicia of the point of intersection of optical paths 18 and 20. As will be explained more fully in the description of the method, the center of the reticle represents the point at which the optical path 18 intersects the surface of the receiver. The reticle 24 may be on a lens placed at either port 14 or 16 or may be provided on the prism 22 itself.

The only requirement being that reticle 24 be visible from optical port 16 and centered on the first optical path 18.

The cylindrical housing 12 is mounted to a support plate or positioning device 26 by a cylindrical collar 28. Extending from the back surface of the substantially planar support plate 26 are three adjustable screws 30, 32, and 34. The three screws define at their pointed ends a plane. Once the housing 12 has been mounted to plate 26 via collar 28, the three screws 30, 32, and 34 are adjusted by trained technicians using a jig until the optical path 18 is perpendicular to the plane defined by the points of the three adjustable screws. Thus the assembly of the housing 12 to the plate 26 need not be done to critical tolerances since the final adjustment is provided by the adjusting screws. Similarly, the adjustment of the screws will compensate for any planar deviations of the plate 26. Since only three points are needed to define a plane, the three screws 30, 32, 34 are provided. Additional screws may be provided but they are not needed to define a specific plane.

Provided along the periphery of plate 26 are four notches 36, 38, 40, and 42. A line drawn between notches 36 and 40 intersects a line drawn between notches 38 and 42 at the center of reticle 24 representing optical path 18 which in turn represents a point at which optical path 18 intersects, perpendicularly, the plane defined by the adjustable screws 30, 32, 34. As will be explained more fully in the description of the method in connection with the FIG. 3, the point at which optical path 18 intersects the plane of the three screw points is also the plane of the film and can be determined by marking the notches 36, 38, 40, and 42 and drawing the connecting intersecting lines as just described.

A typical flash radiograph apparatus as illustrated in FIG. 3 includes a support stand 44 supporting x-ray films 46 and 48 on two different surfaces ninety degrees apart. Opposite the film 46 and mounted to support 50 is a first flash x-ray tube 52. Similarly, opposite film 48 and mounted to support 54 is a second flash x-ray tube 56. A pair of optical alignment devices 10 are shown positioned respectively on x-ray films 46 and 48. It should be noted that the pair of optical alignment devices 10 are used for purpose of illustration only and in actuality only one device is needed to align the pair of flash x-ray tubes 52 and 56 in two separate alignment operations. As noted previously, the accuracy of the flash radiograph apparatus depends upon the location of a point at which a source of radiation intersects perpendicularly a radiation sensitive receiver. The optical alignment device 10 is used to determine that point and assure the perpendicularity of the optical axis of the flash x-ray tube relative to the x-ray film.

The method of alignment begins with the placing of the optical alignment device 10 on, for example, x-ray film 46. The points of adjusted screws 30, 32, and 34 engage the surface of x-ray film 46 and guarantees the perpendicularity of optical path 18 of the optical alignment device to the surface 46. A user, who may be unskilled, then views through port 16, the reticle 24 and directs the adjustment of flash x-ray tube 52 until the optical axis 58 of flash x-ray tube 52 coincides with optical path 18 of the optical alignment device 10. Before or after the adjustment of flash x-ray tube 52, the location of notches 36, 38, 40, and 42 are marked on the film 46. After removing the optical alignment device 10, the point at which a line between the mark of notch 36 and the mark of notch 40 intersect the line between the mark of notch 38 and the mark of notch 42 is determined and marked on the film 46. It is this last mark point which is critical to the analysis of the film 46 after the test of the projectile is performed. A single optical alignment device 10 is then positioned on the surface of x-ray film 48 and flash x-ray tube 56 is adjusted such that its optical axis 60 coincides with the optical path 18 of the optical alignment device 10. The method is repeated for each pair of flash x-ray tubes along the support stands.

It should be noted that the optical alignment device 10 is placed between the radiation source and the receiver, which in this case is a flash x-ray tube and x-ray film. The user then positions himself also between the source and the receiver and directs optical alignment. As discussed in the prior art, this allows the device to be used with photographic apparatus mounted in closed quarters. Also, the setting of adjustable screws 30, 32, and 34 by trained personnel at a central location guarantees the perpendicularity of the optical path of the alignment device without adjustment in the field.

From the preceding description of the preferred embodiment, it is evident that the objects of the invention are attained and although the invention has been described and illustrated in detail, it is to be completely understood that the same is by way of illustration and example only and is not to be taken by way of limitation. Although the optical alignment device 10 has been illustrated for use with flash x-ray tubes and x-ray film in flash radiograph apparatus, it is obvious that the alignment device may be used to align any source of radiation with a receiver of radiation. It should be similarly noted that even though the device 10 is shown positioned on the receiver, it is obvious that the device may also be positioned on the source of radiation. By positioning the device 10 on the receiver of radiation, the point at which the optical path of the source intersects perpendicularly the receiver can be determined and marked.

I wish it to be understood that I do not desire to be limited to the exact details of construction shown and described, for obvious modifications can be made by all persons skilled in the art.

What is claimed is:

1. A device for optically aligning a source of radiation and a radiation receiver having a planar surface along a selected optical axis comprising:

a housing, a first optical path in said housing, means for positioning said housing on said receiver such that said first optical path is coincident with said optical axis, wherein said positioning means includes a substantially planar portion, at least three elements extending from said substantially planar portion and adjustably mounted to said substantially planar portion for positioning said first optical path perpendicular to said planar surface of said receiver, and means for indicating four reference points on a surface of said receiver from which the point at which said optical axis intersects said surface can be determined, first port means in said housing along said first optical path for providing optical access for said source to said first optical path, means in said housing for producing a second optical path in said housing intersecting at an angle with said first optical path, and second port means in said housing along said second optical path for providing optical access to said first optical path via said second optical path.

2. The device of claim 1 wherein said housing is generally cylindrical having said first optical path along the longitudinal axis of said cylinder and said second optical path along the radial axis of said cylinder.

3. The device of claim 1 wherein said receiver is a film responsive to the medium of radiation of said source.

4. The device of claim 3 wherein said source is a first plurality of flash radiation sources and said film is a single continuous sheet for receiving radiation from all of said first plurality of flash radiation sources.

5. The device of claim 1 wherein said indicating means are four openings in a plate which extends substantially perpendicular to said first optical path.

6. The device of claim 1 including an indicia of said first optical path visible from said second port means.

7. A method of aligning a source of radiation with a point on a radiation responsive surface comprising the steps of:
positioning an optical device between said source and said surface so that a first optical path of said optical device is perpendicular to said surface at said point, wherein said positioning step includes the steps of adjusting three elements extending from said optical device so that said first optical path is perpendicular to the plane defined by the ends of said three elements, and placing said ends on said surface,
viewing along a second optical path of said optical device an indicia of said point,
adjusting the position of said source of radiation until the axis of said source of radiation appears on said indicia, and
locating said point by marking two pairs of points indicated by said device, the members of each of said pairs of points are 180 degrees apart, and projecting a line between the members of each pair whereby the intersection of said projected lines locates said point on said surface.

* * * * *